(12) United States Patent
Duan et al.

(10) Patent No.: US 12,197,599 B2
(45) Date of Patent: Jan. 14, 2025

(54) METHOD AND APPARATUS FOR MANAGING INFORMATION ABOUT MEASUREMENT DEVICE PRELIMINARY CLASS

(71) Applicants: Mettler-Toledo (Changzhou) Precision Instruments Ltd., Jiangsu (CN); Mettler-Toledo (Changzhou) Measurement Technology Ltd., Jiangsu (CN); Mettler-Toledo International Trading (Shanghai) Co., Ltd., Pilot Free Trade Zone (CN)

(72) Inventors: QianNi Duan, Jiangsu (CN); GuoJun Xie, Jiangsu (CN); Jean-Christophe Emery, Jiangsu (CN); Feng Dai, Jiangsu (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd. Ltd., Shanghai (CN)

( * ) Notice: Subject to any disclaimer, the term of this patent is extended or adjusted under 35 U.S.C. 154(b) by 959 days.

(21) Appl. No.: 17/147,345

(22) Filed: Jan. 12, 2021

(65) Prior Publication Data
US 2021/0216651 A1    Jul. 15, 2021

(30) Foreign Application Priority Data

Jan. 13, 2020  (CN) .......................... 202010033659.2

(51) Int. Cl.
*G06F 21/62* (2013.01)
*G06F 8/65* (2018.01)
*G06F 16/27* (2019.01)

(52) U.S. Cl.
CPC .............. *G06F 21/62* (2013.01); *G06F 8/65* (2013.01); *G06F 16/27* (2019.01)

(58) Field of Classification Search
CPC ..... H04L 63/126; H04L 63/123; H04L 63/12; H04L 2209/56; H04L 9/50;
(Continued)

(56) References Cited

U.S. PATENT DOCUMENTS 8,600,685 B2  12/2013  Kalgren
9,805,196 B2  10/2017  Ray et al.
(Continued)

FOREIGN PATENT DOCUMENTS

EP        3594867 A1    1/2020
WO    WO 2019/227451 A1  12/2019

OTHER PUBLICATIONS

Extended European Search Report in EP Patent Application No. 20213067.0 dated Feb. 3, 2021.
(Continued)

*Primary Examiner* — Tae K Kim
(74) *Attorney, Agent, or Firm* — Knobbe, Martens, Olson & Bear, LLP

(57) ABSTRACT

A method and apparatus for managing information about a measurement device, which is applied to a network system including a plurality of blockchains that includes a first blockchain and a second blockchain, data sender node devices and data manager node devices, the method can comprise receiving a cross-chain request from a data manager node device for device state information associated with a measurement device stored in the first blockchain, wherein the data manager node device is a node device for a second blockchain, verifying, in response to the cross-chain request, that a data manager associated with the data manager node is authorized to manage the device state (Continued)

information, obtaining a target depository transaction corresponding to the device state information, wherein the target depository transaction is stored on the first blockchain and was previously saved to the first blockchain by a data sender node device, wherein the data sender node device is a node device for the first blockchain, and performing management of the device state information based on the target depository transaction.

19 Claims, 5 Drawing Sheets

(58) Field of Classification Search
CPC ......... G06Q 2220/127; G06Q 2220/12; G06Q 2220/123; G06F 21/64
See application file for complete search history.

(56) References Cited

U.S. PATENT DOCUMENTS

| | | | |
|---|---|---|---|
| 10,924,466 B2* | 2/2021 | Biyani | H04L 63/08 |
| 11,032,293 B2* | 6/2021 | Biyani | H04L 63/126 |
| 2017/0078446 A1* | 3/2017 | Barsness | G06F 9/50 |
| 2017/0287090 A1* | 10/2017 | Hunn | H04L 63/12 |
| 2018/0007131 A1 | 1/2018 | Cohn et al. | |
| 2018/0018149 A1* | 1/2018 | Cook | G06F 8/70 |
| 2018/0020045 A1* | 1/2018 | Cook | G06F 8/30 |
| 2019/0236562 A1* | 8/2019 | Padmanabhan | H04L 63/00 |
| 2019/0238327 A1* | 8/2019 | Li | H04L 9/50 |
| 2019/0268351 A1* | 8/2019 | Qiu | H04L 67/141 |
| 2019/0279206 A1* | 9/2019 | Song | G06F 16/1834 |
| 2019/0305935 A1* | 10/2019 | Qiu | H04L 9/0637 |
| 2019/0318328 A1* | 10/2019 | Castinado | G06Q 20/382 |
| 2019/0340266 A1* | 11/2019 | Vo | G06F 16/2365 |
| 2020/0074450 A1* | 3/2020 | Fletcher | H04L 9/0833 |
| 2020/0118068 A1* | 4/2020 | Turetsky | G06F 9/45558 |
| 2020/0118092 A1* | 4/2020 | Gauvreau | G06F 16/2246 |
| 2020/0143300 A1* | 5/2020 | Weldemariam | G06F 21/572 |
| 2020/0184548 A1 | 6/2020 | Satyanarayan et al. | |
| 2020/0193255 A1 | 6/2020 | Manamohan | |
| 2020/0356082 A1* | 11/2020 | Wang | H04W 12/009 |
| 2020/0382509 A1* | 12/2020 | Easwar Prasad | H04L 63/08 |
| 2021/0176202 A1* | 6/2021 | Tran | G06Q 20/389 |
| 2021/0248671 A1 | 8/2021 | Yang et al. | |
| 2021/0258323 A1* | 8/2021 | Qiu | H04L 9/0894 |

OTHER PUBLICATIONS

Extended European Search Report in European Patent Application No. 20213068.8 issued Feb. 5, 2021.

* cited by examiner

METHOD AND APPARATUS FOR MANAGING INFORMATION ABOUT MEASUREMENT DEVICE PRELIMINARY CLASS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTIONS

Field of the Inventions

One or more embodiments of the specification relate to the technical field of blockchains, in particular to a method and apparatus for managing information about a measurement device.

Description of the Related Art

Measurement devices or apparatuses have a wide range of applications in various industries. During their life cycle of production, logistics, installation, usage and maintenance, various device state information may be generated, and the various device state information may be of vital significance for the proper and normal use of the measurement devices. Currently, security for the storage and management of such information is insufficient or inadequate and thus at risk of abnormal or illegitimate information modification, and thus the reliability of the information is not satisfactory.

Current methods for storing and managing various state information about a measurement device generally include decentralized physical storage information management and database or cloud storage-based information management. Using a decentralized physical storage solution has some limitations and risks. For example, information management, information retrieval and multi-functional information uses cannot be performed efficiently, and information may be lost due to failure of a storage device. Using a database or cloud storage-based information management, although efficiency of information retrieval and use is improved, security remains insufficient.

With respect to existing methods for managing information about measurement devices based on blockchain technology, all relevant parties, such as the manufacturer, the logistics company, the user and the maintainer of the measurement device, throughout a life cycle of a measurement device, are required to upload information into the same blockchain, making it difficult to guarantee the privacy and data security for the information uploaded by each relevant party. In addition, because there can be too much uploaded device state information data, the physical configuration requirements for the node devices of each relevant party are increased.

SUMMARY OF THE INVENTIONS

In view of limitations of prior art systems, one or more embodiments described herein provide a new and improved method and apparatus for managing information associated with a measurement device, a computer device, and a computer readable storage medium.

In one or more embodiments, a method for managing information about a measurement device, which is applied to a network system including a plurality of blockchains or distributed ledgers, the network system comprising data sender node devices and data manager node devices, wherein the data sender node devices are node devices for a first blockchain, and the data manager node devices are node devices for a second blockchain; the first blockchain storing a target depository transaction, sent by the data sender node devices, that comprises device state information about the measurement device; the method being executed by a node device of the first blockchain, and comprising: receiving a cross-chain management request from the data manager node devices for the device state information about the measurement device stored in the first blockchain; verifying, in response to the cross-chain management request, whether the data manager has a management authority over the device state information about the measurement device; and if yes, obtaining the target depository transaction, and performing management of the device state information about the measurement device based on the target depository transaction.

In yet another embodiment disclosed herein, the cross-chain management request is a request for obtaining the device state information about the measurement device across chains; and said performing management of the device state information about the measurement device comprises: sending the device state information about the measurement device to the data manager node devices across chains.

In yet another embodiment disclosed herein, the first blockchain is deployed with a smart contract for managing the device state information, and a processing logic corresponding to the contract code of the smart contract comprises a management authority verification logic; and said verifying, in response to the cross-chain access request, whether the data manager has a management authority over the device state information about the measurement device comprises: invoking, in response to the cross-chain access request, the management authority verification logic in the smart contract to verify whether the data manager has the management authority over the device state information about the measurement device.

In yet another embodiment disclosed herein, the processing logic corresponding to the contract code of the smart contract further comprises a management logic for the device state information; and said obtaining the target depository transaction, and performing management of the device state information about the measurement device based on the target depository transaction comprises: further invoking, after verifying that the data manager has the management authority over the device state information about the measurement device, the management logic in the smart contract for the device state information, obtain the target depository transaction, and perform management of the device state information about the measurement device based on the target depository transaction.

In yet another embodiment disclosed herein, the first blockchain and the second blockchain are different sub-chains belonging to the same alliance chain.

In yet another embodiment disclosed herein, said receiving a cross-chain access request from the data manager node devices for the device state information about the measurement device stored in the first blockchain comprises: receiving, via a cross-chain relay device, a cross-chain access request from the data manager node devices for the device state information about the measurement device stored in the first blockchain.

In yet another embodiment disclosed herein, the data sender node devices comprise one or more of a production recording node device of the measurement device, or an initial calibration node device, or a measurement authentication institute node device, or a logistics agency node device, a user node device, or a maintainer node device; the target depository transaction comprises a unique identification code corresponding to the measurement device; and the device state information comprises one or more of raw material information, production process information, initial calibration information, quality certification information, logistics circulation information, a device replicating parameter, abnormal state information, measurement data record information, maintenance record information, or electronic contract information related to the measurement device.

In yet another embodiment disclosed herein, the target depository transaction comprises the latest electronic lead-sealing code of the measurement device; the cross-chain management request comprises an existing lead-sealing identification code of the measurement device; and the management logic for the device state information that is comprised by the processing logic corresponding to the contract code of the smart contract comprises: step A, obtaining the target depository transaction; step B, determining, based on the target depository transaction, whether the latest lead-sealing identification code and the existing lead-sealing identification code are the same; and step C, sending, if the latest lead-sealing identification code is different from the existing lead-sealing identification code, a preset prompt or alarm operation to the data manager node devices across chains.

In yet another embodiment disclosed herein, the target depository transaction comprises the latest calibration information about the measurement device; the cross-chain management request comprises existing calibration information about the measurement device; and the management logic for the device state information that is comprised by the processing logic corresponding to the contract code of the smart contract comprises: step A, obtaining the target depository transaction; step B, determining, based on the target depository transaction, whether the latest calibration information and the existing calibration information are the same; and step C, sending, if the latest calibration information is different from the existing calibration information, the latest calibration information to the data manager node devices across chains, so that the data manager node devices can calibrate the measurement device based on the latest calibration information.

In yet another embodiment disclosed herein, the target depository transaction comprises the latest software program corresponding to the measurement device and the version number of the latest software program; the data manager node device is the measurement device; the cross-chain management request comprises the version number of a current software program of the measurement device; and the management logic for the device state information that is comprised by the processing logic corresponding to the contract code of the smart contract comprises: step A, obtaining the target depository transaction; step B, comparing, based on the target depository transaction, whether the version number of the latest software program and the version number of the current software program differ by a preset level; and step C, if yes, sending the latest software program to the measurement device across chains, so that the measurement device performs upgrading of the software version.

In yet another embodiment disclosed herein, the target depository transaction comprises first measurement result information about the measurement device; the cross-chain management request comprises second measurement result information about the measurement device; and the management logic for the device measurement information that is comprised by the processing logic corresponding to the contract code of the smart contract comprises: step A, obtaining the target depository transaction; step B, comparing, based on the target depository transaction, whether the first measurement result information and the second measurement result information are the same; and step C, sending, if the first measurement result information is different from the second measurement result information, the first measurement result information or a preset prompt or alarm operation to the data manager node devices across chains.

In yet another embodiment disclosed herein, the target depository transaction comprises first device operation information about the measurement device; the cross-chain management request comprises second device operation information about the measurement device; and the management logic for the device operation information that is comprised by the processing logic corresponding to the contract code of the smart contract comprises: step A, obtaining the target depository transaction; step B, comparing, based on the target depository transaction, whether the first device operation information and the second device operation information are the same; and step C, sending, if the first device operation information is different from the second device operation information, the first device operation information or a preset prompt or alarm operation to the data manager node devices across chains.

Accordingly, in some embodiments, an apparatus for managing information about a measurement device can be applied to a network system including a plurality of blockchains, the network system comprising data sender node devices and data manager node devices, wherein the data sender node devices are node devices for a first blockchain, and the data manager node devices are node devices for a second blockchain. The first blockchain can store a target depository transaction, sent by the data sender node devices, that comprises device state information about the measurement device. The apparatus can be applied at a node device of the first blockchain, and can comprise: a receiving unit for receiving a cross-chain management request from the data manager node devices for the device state information about the measurement device stored in the first blockchain; a verification unit for verifying, in response to the cross-chain management request, whether the data manager has a management authority over the device state information about the measurement device; and an execution unit for obtaining the target depository transaction, and performing management of the device state information about the measurement device based on the target depository transaction.

In yet another embodiment disclosed herein, the cross-chain management request is a request for obtaining the device state information about the measurement device across chains; and the execution unit is further configured to: obtain the target depository transaction, and send the device state information about the measurement device to the data manager node devices across chains.

In yet another embodiment disclosed herein, the first blockchain is deployed with a smart contract for managing the device state information, and a processing logic corresponding to the contract code of the smart contract comprises a management authority verification logic; and the verification unit is further configured to: invoke, in response to the cross-chain access request, the management authority verification logic in the smart contract to verify whether the data manager has the management authority over the device state information about the measurement device.

In yet another embodiment disclosed herein, the processing logic corresponding to the contract code of the smart contract further comprises a management logic for the device state information; and the execution unit is further configured to: further invoke, after verifying that the data manager has the management authority over the device state information about the measurement device, the management logic in the smart contract for the device state information, obtain the target depository transaction, and perform management of the device state information about the measurement device based on the target depository transaction.

In yet another embodiment disclosed herein, the first blockchain and the second blockchain are different subchains belonging to the same alliance chain.

In yet another embodiment disclosed herein, the receiving unit is further configured to: receive, via a cross-chain relay device, a cross-chain access request from the data manager node devices for the device state information about the measurement device stored in the first blockchain.

In yet another embodiment disclosed herein, the data sender node devices comprise one or more of a production recording node device of the measurement device, or an initial calibration node device, or a measurement authentication institute node device, or a logistics agency node device, a user node device, or a maintainer node device; the target depository transaction comprises a unique identification code corresponding to the measurement device; and the device state information comprises one or more of raw material information, production process information, initial calibration information, quality certification information, logistics circulation information, a device replicating parameter, abnormal state information, measurement data record information, maintenance record information, or electronic contract information related to the measurement device.

In yet another embodiment disclosed herein, the target depository transaction comprises the latest electronic lead-sealing code of the measurement device; the cross-chain management request comprises an existing lead-sealing identification code of the measurement device; and the management logic for the device state information that is comprised by the processing logic corresponding to the contract code of the smart contract comprises: step A, obtaining the target depository transaction; step B, determining, based on the target depository transaction, whether the latest lead-sealing identification code and the existing lead-sealing identification code are the same; and step C, sending, if the latest lead-sealing identification code is different from the existing lead-sealing identification code, a preset prompt or alarm operation to the data manager node devices across chains.

In yet another embodiment disclosed herein, the target depository transaction comprises the latest calibration information about the measurement device; the cross-chain management request comprises existing calibration information about the measurement device; and the management logic for the device state information that is comprised by the processing logic corresponding to the contract code of the smart contract comprises: step A, obtaining the target depository transaction; step B, determining, based on the target depository transaction, whether the latest calibration information and the existing calibration information are the same; and step C, sending, if the latest calibration information is different from the existing calibration information, the latest calibration information to the data manager node devices across chains, so that the data manager node devices can calibrate the measurement device based on the latest calibration information.

In yet another embodiment disclosed herein, the target depository transaction comprises the latest software program corresponding to the measurement device and the version number of the latest software program; the data manager node device is the measurement device; the cross-chain management request comprises the version number of a current software program of the measurement device; and the management logic for the device state information that is comprised by the processing logic corresponding to the contract code of the smart contract comprises: step A, obtaining the target depository transaction; step B, comparing, based on the target depository transaction, whether the version number of the latest software program and the version number of the current software program differ by a preset level; and step C, if yes, sending the latest software program to the measurement device across chains, so that the measurement device performs upgrading of the software version.

In yet another embodiment disclosed herein, the target depository transaction comprises first measurement result information about the measurement device; the cross-chain management request comprises second measurement result information about the measurement device; and the management logic for the device measurement information that is comprised by the processing logic corresponding to the contract code of the smart contract comprises: step A, obtaining the target depository transaction; step B, comparing, based on the target depository transaction, whether the first measurement result information and the second measurement result information are the same; and step C, sending, if the first measurement result information is different from the second measurement result information, the first measurement result information or a preset prompt or alarm operation to the data manager node devices across chains.

In yet another illustrated embodiment, the target depository transaction comprises first device operation information about the measurement device; the cross-chain management request comprises second device operation information about the measurement device; and the management logic for the device operation information that is comprised by the processing logic corresponding to the contract code of the smart contract comprises: step A, obtaining the target depository transaction; step B, comparing, based on the target depository transaction, whether the first device operation information and the second device operation information are the same; and step C, sending, if the first device operation information is different from the second device operation information, the first device operation information or a preset prompt or alarm operation to the data manager node devices across chains.

Accordingly, in some embodiments, a computer device can comprise: a memory and a processor, wherein the memory has stored thereon a computer program executable by the processor that, when executed by the processor, causes the implementation of the method for managing information about a measurement device as described in the above embodiments.

Accordingly, in some embodiments, a computer readable storage medium has, stored thereon, a computer program that, when executed by a processor, causes the implementation of the method for managing information about a measurement device as described in the embodiments.

It can be seen from the technical solutions that with the methods and apparatuses for managing information about a measurement device provided in this specification, device state information about the measurement device is stored into the blockchain in a decentralized manner to prevent tampering. In addition, access to, or management of, device state information based on a cross-chain information interaction technique for a plurality of blockchains further enhances the privacy and security of device state information data and also reduces the physical configuration requirements for node devices on each associated blockchain.

DETAILED DESCRIPTION OF THE PREFERRED EMBODIMENTS

Figure 1:
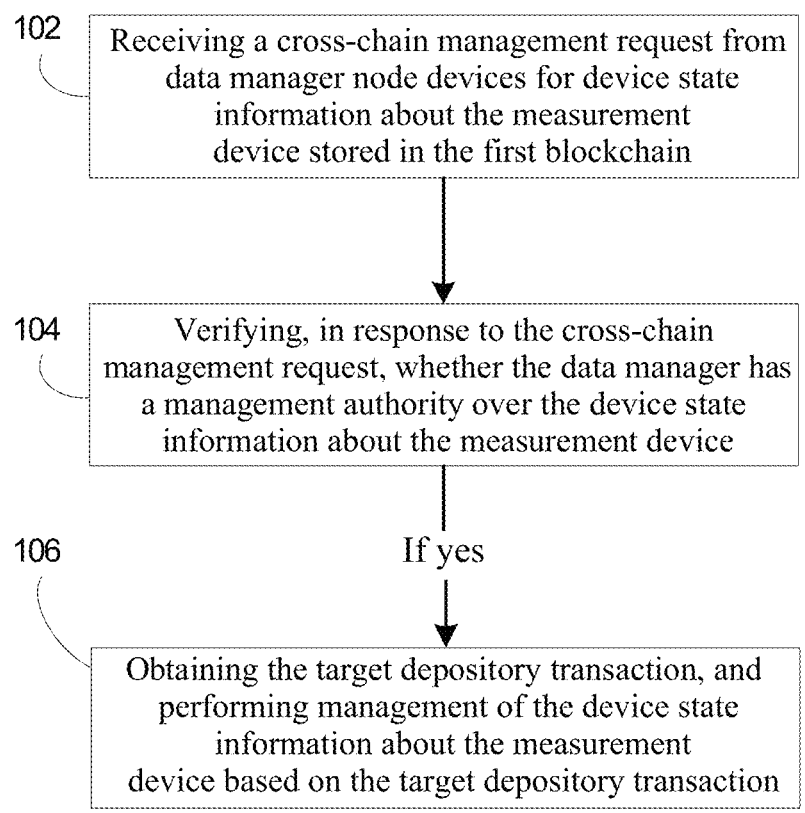
FIG. 1 is a schematic flow diagram of a method for managing information about a measurement device, according to an exemplary embodiment.

Exemplary embodiments and implementations are described in detail herein, examples of which are shown in appended drawings. Where reference is made to the appended drawings in the description below, identical numbers in different drawings represent identical or similar elements, unless otherwise indicated. Implementations described in the following exemplary embodiments are not intended to represent all implementations consistent with one or more embodiments of the specification. Rather, they are merely examples of apparatuses and methods consistent with some aspects of one or more of the embodiments disclosed herein.

It should be noted that steps, elements, or features of a described method may not be required to be performed in the order shown and/or described. In some embodiments, steps, elements, or features of the method may be more or fewer than those shown and/or described in the specification. Moreover, a single step, element, or feature described in the specification may also be decomposed or split into a plurality of steps, while a plurality of described steps may be combined into a single step as well.

Measurement devices have a wide range of applications in various industries. The life cycle of the measurement device may include a production stage, a logistics stage, an installation stage, a usage stage, a maintenance stage or any combination of the stages of the measurement device. During the life cycle of the measurement device, various device state information data can be produced, generated, or created, such as device production environment data produced in the production stage (including, for example, temperature and humidity, acid and alkali conditions, production parameters and difference adjustment parameters of devices such as machine tools, etc.), logistics circulation data produced in the logistics stage (including, for example, information about the time of exiting from and entering a logistics station, environmental information transfer, abnormal logistics transit information, etc.), installation adjustment data produced in the installation stage (including, for example, electronic lead-sealing states, device calibration information, initial parameters, etc.), normal or abnormal usage data produced in the usage stage (including, for example, measurement data produced during normal use, error information when an abnormality occurs, software information carried by the associated device, etc.), and information data produced in the maintenance stage (including, for example, maintenance records, precision information about the associated device after maintenance, software update version numbers, etc.).

The device state information produced during the life cycle of a measurement device is of vital significance for the normal use of the measurement device. Current methods for storing and managing various state information about a measurement device generally include (1) decentralized physical storage information management, that is, storing the device state information in computing servers of a manufacturer, a logistics provider, and/or a user client respectively, or (2) cloud storage data management performed by one or more parties. Security for the storage and management of such device state information is considered insufficient and thus at risk of abnormal data modification. With a method of decentralized physical storage information management, information retrieval and using or applying the information cannot be performed efficiently, and the information may be lost due to failure of a storage device. Furthermore, decentralized physical storage is disadvantageous to the coordination, management, and use of the device state information generated during the life cycle of the measurement device.

In the field of information management of measurement devices based on blockchain or distributed ledger technology all relevant parties, such as the manufacturer, the logistics company, the user, and the maintainer of the measurement device, throughout a life cycle of a measurement device, are required to use the same blockchain or distributed ledger, and since the device state information stored by each relevant party to a blockchain is backed up at each node device of the blockchain, it is difficult to guarantee the privacy and security of the information uploaded by each relevant party. In addition, due to the excessive device state information data deposited by each relevant party, the physical configuration requirements (e.g., data storage capacity, processing power, etc.) for each of the node devices associated with each relevant party are increased.

In view of this, a method for managing information about (or "associated with") a measurement device is applied to a network system including a plurality of blockchains or distributed ledgers, the network system comprises data sender node devices and data manager node devices, wherein the data sender node devices are node devices for a first blockchain, and the data manager node devices are node devices for a second blockchain.

A blockchain, or distributed ledger, according to one or more embodiments may, in particular, refer to a P2P network system comprising various node devices through a consensus mechanism and having a distributed data storage structure, where data in a blockchain is distributed within various "blocks" consecutively connected in time, a later or newer block contains a data summary of a preceding or previous block, and full data backup of all or some of nodes is achieved according to different specific consensus mechanisms (such as POW, POS, DPOS or PBFT). It is well known to a person skilled in the art that since a blockchain system is running under a corresponding consensus mechanism, tampering with data recorded into a blockchain database is difficult by any particular node. For example, for a blockchain employing POW consensus, it would take a hash rate of at least 51% of the whole network to attack or tamper with the existing data. Therefore, the blockchain system is characterized by ensuring the security of data and protecting against attacks and tampering, which is not provided by centralized database systems. Thus, in some embodiments, data recorded into a distributed ledger of a blockchain cannot be tampered with, thereby ensuring the authenticity and fairness of performing data management and use of data stored in the blockchain.

A network system including a plurality of blockchains, according to one or more embodiments, is a multi-chain system composed of the plurality of blockchains, and data access or cross-chain invocation of a smart contract can be performed based on a cross-chain interaction technique between each blockchain. That each of the blockchains constituting the multi-chain system adopts the same underlying protocol is not a requirement, namely, the first blockchain and the second blockchain can either be homogeneous blockchains built based on the same blockchain underlying protocol, or heterogeneous blockchains built based on different blockchain underlying protocols.

In actual applications, all relevant parties involved in the life cycle of a measurement device (such as the manufacturer, logistics, user, maintainer) can construct their own blockchain based on each of their own physical hardware power, or, multiple parties with mutual trust can cooperatively build a blockchain comprising the multi-party node devices, or, relevant parties that do not build a blockchain (e.g., have no requirement or power) can join a blockchain built by a trusted relevant party (e.g., manufacturer, logistics, user, maintainer, etc.).

Since all relevant parties, such as the manufacturer, logistics, user, maintainer, involved throughout the life cycle of a measurement device have the desire to store the device state information about the measurement device into a blockchain, and also have the desire to manage information based on the device state information stored in the blockchain, a data sender or data manager according to at least some embodiments disclosed herein may be any of the parties involved in the life cycle of the measurement device.

FIG. 1 illustrates process steps of a method for managing information about a measurement device performed by a node device in a first blockchain, according to an exemplary embodiment. The first blockchain stores a target depository transaction, sent by data sender node devices, that comprises device state information about the measurement device.

The measurement device can comprise any measurement device as known to a person of ordinary skill in the art. Furthermore, devices, apparatuses, or device or apparatus modules that may have the capability of measurement or calibration may be encompassed within the scope of the measurement devices described herein as well.

The life cycle of the measurement device includes a plurality of stages within a cycle of the measurement device from production to retirement of the measurement device, such as a production stage, a logistics stage, an installation stage, a usage stage, a maintenance stage, or any combination of the multiple stages.

In some embodiments, state information corresponding to the production stage of the measurement device may include various production parameters recorded during production of the measurement device, such as production date, raw materials for production, production processes, product serial numbers, production environment, production device parameters, and information data of various production chains of the measurement device.

In some embodiments, device state information corresponding to the logistics stage of the measurement device may include information data produced by the measurement device in the distribution process after production (e.g., while the measurement device is transported to the location of operation), such as information about the time of exiting from and entering a logistics station, environmental information transfer, abnormal logistics transit information, and the like; and for a rather precise and sensitive measurement device, the device state information in the logistics stage is of vital depository significance in traceability management of the measurement device.

In some embodiments, the measurement device, especially a large-scale or precise measurement device for example, needs to be installed and debugged before being used. Therefore, device state information corresponding to the installation stage of the measurement device may include calibration parameters required for use by the measurement device in the installation stage, or data produced in the installation stage, such as error probability parameters, installation state description, parameter backup or recovery information (for example, factory setting parameters), and the like.

In some embodiments, the device state information corresponding to the usage stage of the measurement device may include any information data (including information such as image, temperature, three-dimensional size, weight acquired by the measurement device, or the like) produced or required for reference during use of the measurement device, such as measurement data records produced in normal use, error information when an abnormality or error occurs (e.g., abnormal temperature, overloaded shock, etc.), measurement device operation information (e.g., which may include information about the operating personnel of the measurement device, or operation location information, or operation time information, or operation content information), software information associated with or stored on the device, standard operation procedure (SOP) information data, and the like.

In some embodiments, electronic lead-sealing information data associated with the measurement device is information data reflecting whether the measurement device experienced issues related to unknown sealing off or abnormal damage. Therefore, in some embodiments, the device state information corresponding to the usage stage may also include the electronic lead-sealing information data of the measurement device (or a particular element or module of the measurement device, for example).

In some embodiments, the performance indicator data of the measurement device is associated with the device state information corresponding to the usage stage, and based on the specific type and attribute of the measurement device. Also, the device performance indicator data may include one or more of metering performance indicator data, measurement precision indicator data, creep indicator data, measurement repeatability indicator data, operating environment indicator data, and electromagnetic compatibility indicator data.

When the measurement device is used and operates, its operating states and measurement results may be affected by the operating environment. Therefore, the device state information corresponding to the usage stage may also include device operating environment data, such as one or more of temperature, humidity, air pressure, burden or load, shock, tilt, and other data when the device operates.

Device state information corresponding to the maintenance stage of the measurement device may include any information data produced or referenced and used by the measurement device during maintenance, such as recovery data (e.g., factory setting data), fault detection procedure data, maintenance records, maintenance service personnel data, maintenance time, maintenance device identifier, and the like.

Therefore, in order to complete the blockchain storage of the device state information corresponding to each stage of the life cycle of the measurement device, relevant parties corresponding to various stages of the life cycle of the measurement device: manufacturer, logistics, installer, user, maintainer (generally the same as the installer) can send target depository transaction to a blockchain to which the relevant party is associated, to store the corresponding device state information.

In one or more embodiments, the target depository transaction may include device state information of one type, or in one life cycle stage; and may also include device state information of multiple types, or in multiple life cycle stages; may include device state information about one measurement device, or may include device state information about multiple measurement devices.

The data sender node devices may be a computer device managing a production, logistics, installation, use, or maintenance process of a measurement device, or the data sender node devices may be a computer device communicatively connected to the measurement device, or may be the measurement device itself.

Further, in order to ensure the reliability and security of the state information about an on-chain device, the reliability of the measurement device of the data sender or the personnel of the information collection sender can be improved by implementing authentication technology.

For example, when the personnel of the information collection sender enters a relevant or monitored working area, the identity of the personnel can be authenticated (e.g., specific identity identification authentication techniques may include ID pass authentication, biological ID information authentication, etc.) or, the identity authentication information of the personnel associated with an information collection system (which can be used as part of the content included in the target depository transaction, for example) is uploaded to the first blockchain for storage.

As another example, the data sender can satisfy the account and password authentication by entering information manually prior to accessing desired information; the data sender can use an information collection system based on visualization interfaces such as web pages, computer or mobile phone APP clients, which support a variety of information entry methods, such as scanning two-dimensional codes, image recognition, voice entry, etc.; the information collection system can also be interfaced to other information systems, and operating personnel can enter corresponding information according to the entries listed in the menu in the other information systems to enter the information into the blockchain.

As another example, when the measurement device is used as a data sender node device, the identity identification information of the measurement device, such as an electronic lead-sealing code, device model, and device weight and size and other physical information (which can be used as part of the content included in the target depository transaction, for example), can be sent to the blockchain for recording the target depository. The first blockchain can also adopt a permission control policy, and only receives the target depository transaction sent by a measurement device that satisfied the identity authentication.

After the consensus verification by the node device of the first blockchain on the target depository transaction (which can include the device state information about the measurement device) is passed, the target depository transaction is stored in the distributed database of the first blockchain, and any node device (comprising a data sender node device, for example) included in the first blockchain can then obtain the target depository transaction from the first blockchain ledger backed up thereby.

Step 102, receiving a cross-chain management request from the data manager node devices for the device state information about the measurement device stored in the first blockchain.

In an illustrated embodiment, a plurality of blockchains can achieve cross-chain interfacing via cross-chain relay devices. A cross-chain relay device can be respectively interfaced to the plurality of blockchains via a bridging interface, and based on an implemented data transmission logic, complete the cross-chain data interaction between the plurality of blockchains. For example, the cross-chain technique used in the implementation of the cross-chain relay, in actual applications, the plurality of blockchains can be connected through cross-chain mechanisms such as side-chain technology and notary technology. After the plurality of blockchains are interfaced by means of cross-chain relays, the blockchains can read and authenticate data on the other blockchains, and can also invoke smart contracts deployed on the other blockchains through cross-chain relays.

It should be noted that the cross-chain relay is used to transmit data between the plurality of blockchains. The cross-chain relay does not need to store the transmitted data persistently, nor does it need to maintain the data state of the transmitted data. In actual applications, the cross-chain relays can be configured on devices, nodes, or platforms outside the plurality of blockchains to which they are connected, or on node devices of the plurality of blockchains to which they are connected.

In this embodiment, for example, the cross-chain management request is sent by the data manager node device to the node device (e.g., the data sender node device) of the first blockchain via the cross-chain relay device. In particular, the cross-chain relay device may be a common node device of the first blockchain and the second blockchain. The data manager node device sends a management request for device state information to a node device (e.g., a data sender node device) of the first blockchain by interacting with the common node device.

In yet another illustrated embodiment, the first blockchain and the second blockchain are different sub-chains belonging to the same alliance chain, and the data manager node device belonging to the second blockchain can initiate a data management request to the first blockchain, and based on a cross-chain data access mechanism setting of the alliance chain, send a cross-chain management request to the node device of the first blockchain.

The cross-chain management request may be a cross-chain data obtaining request to obtain the device state information about the measurement device stored in a first blockchain, and the request may also be a cross-chain data application request to realize in the node device of the first blockchain the application management of the device state information.

Step 104, verifying, in response to the cross-chain management request, whether the data manager has a management authority over the device state information about the measurement device.

The multi-chain system will be provided with a corresponding authority control mechanism to manage the node devices in the system for management behaviors such as cross-chain data access or cross-chain data application.

When the first blockchain and second blockchain are different sub-chains belonging to the same alliance chain, based on a transaction read and write authority control mechanism of the alliance chain, the management authority of the data manager over the device state information included in the target depository transaction can be controlled, updated, or managed by controlling the obtaining authority of the data manager node device over the target depository transaction.

When the first blockchain and the second blockchain do not have an alliance relationship, and after the data manager node device utilizes the cross-chain relay device, the management node (or data sender node device) of the first blockchain can issue a digital certificate to the data manager with management authority such as device state information obtaining or application authority. When the data manager node device sends the cross-chain management application to the management node (or data sender node device) of the first blockchain via the cross-chain relay device, based on the digital certificate of the data manager, whether it has the management authority over the device state information, can be verified.

In yet another illustrated embodiment, the first blockchain is deployed with a smart contract for managing the device state information, and a processing logic corresponding to the contract code of the smart contract comprises a management authority verification logic; and said verifying, in response to the cross-chain access request, whether the data manager has a management authority over the device state information about the measurement device comprises: invoking, in response to the cross-chain access request, the management authority verification logic in the smart contract to verify whether the data manager has the management authority over the device state information about the measurement device.

For example, the process of verifying whether the data manager has a management authority over the device state information about the measurement device comprises: verifying whether a public key corresponding to the data manager belongs to a user whitelist set by the smart contract and having management authority over device state information.

Step 106, if yes (e.g., the data manager has a management authority over the device state information about the measurement device), the method proceeds to obtaining a target depository transaction sent by the data sender node device to the first blockchain, and performing management of the device state information about the measurement device based on the target depository transaction.

Based on the data storage setting of the first blockchain, the target depository transaction can be stored in the distributed ledger (such as a block) of the blockchain, or can be stored in the account storage space corresponding to an account of the smart contract. For example, the smart contract can obtain the target depository transaction based on the address (e.g., the TXhash) of the target depository transaction.

When the cross-chain management request is a request for obtaining device state information about the measurement device, the management of the device state information about the measurement device performed by the node device of the first blockchain can include: sending the device state information about the measurement device to the data manager node devices across chains, to enable the data manager node device to perform further application on the device state information about the measurement device.

When the cross-chain management request is an application management request for device state information about the measurement device, in yet another illustrated embodiment, the processing logic corresponding to the contract code of the smart contract further comprises a management logic for the device state information; accordingly, performing, by the node device of the first blockchain, management of the device state information about the measurement device comprises: further invoking, by the node device of the first blockchain, after verifying that the data manager has the management authority over the device state information about the measurement device, the management logic in the smart contract for the device state information, obtain the target depository transaction sent by the data sender node device to the first blockchain, and perform management of the device state information about the measurement device based on the target depository transaction.

It can be seen from the technical solutions that with the method for managing information about a measurement device provided in the one or more embodiments, the device state information about the measurement device is stored in the first blockchain in a decentralized manner to prevent tampering. In addition, the management of device state information based on a cross-chain information interaction technique for a plurality of blockchains further increases the privacy and security of device state information data and reduces the physical configuration requirements for the node devices on each blockchain, as described herein. After the data manager node device obtains the device state information, not only can the application management of the device state information be carried out locally in the data manager node device, but also the smart contract deployed on the second blockchain, which declares the management logic for the device state information, can be invoked to quickly and fairly carry out the application management of the device state information.

When the data manager node device of the second blockchain completes the management of the device state information about the measurement device by making a cross-chain invocation to the smart contract deployed by the first blockchain, compared with locally running device state information management by the data manager node device in a centralized manner, the smart contract is invoked at any time according to the cross-chain management request of the data manager, so that the efficiency of device state information management can be greatly improved; moreover, performing with the smart contract has the advantages of lower human intervention and decentralized authority, which further increases the fairness of device state information management behaviors.

Contents of device state information associated with a measurement device that are stored in the distributed ledger of the first blockchain may be updated continuously (and consecutively) with continued use of the measurement device. Based on the state data of the measurement device, analysis and use of the data may be performed on various device state information about the measurement device, for example, big data analysis or artificial intelligence technology may be used to perform information analysis on a full life cycle of the measurement device, or life cycle management contents of the measurement device such as traceability tracking, usage calibration, lead-sealing state determination, and usage state determination.

It is known to a person skilled in the art that the one or more embodiments start from the roles as the data sender and the data manager, and the blockchain to which the data sender belongs is defined as the first blockchain, and the blockchain to which the data manager belongs is defined as the second blockchain; since in actual applications, a node device may be either a data sender or a data manager, and the blockchain to which the node device belongs is the first blockchain when it is a data sender and the second blockchain when it is a data manager.

The description below includes a plurality of embodiments of information management of measurement device based on the device state information included in the target depository transaction.

Information Inquiry Management

A measurement device generally undergoes production, calibration, authentication, logistics and other stages from production to delivery to a user of the measurement device, and device state information produced during these stages would continuously be stored into a first blockchain to which it belongs by one or more data sender node devices, for example, raw material information (such as a material number or code designation) or production process information about the measurement device may be sent from a production information recording node, initial calibration information about the measurement device may be sent by a node responsible for calibrating the measurement device, quality certification information about the measurement device may be sent by a measurement authentication institute node, and logistics circulation information about the measurement device may be sent by a logistics node, for example.

Based on their own computer physical configurations and information security and privacy demands, the above described production information recording node, for example, the node responsible for calibrating the measurement device, the measurement authentication institute node, and the logistics node may be in the same blockchain (e.g., the first blockchain described in a plurality of embodiments described above), or may be in or associated with a plurality of different blockchains (namely, in a plurality of first blockchains).

A measurement device user node device, as a data manager, may belong to the second blockchain system described in the above embodiments. The measurement device user node device may initiate, based on usage demands, a cross-chain access request (e.g., as an embodiment of a cross-chain management request) to access the device state information stored in the first blockchains described above.

In order to facilitate inquiry and retrieval, by node devices of the first blockchain, of specific information requested to be accessed by the measurement device user node device, a unique identification code corresponding to the measurement device may be included in target depository transactions stored in the first blockchain and the cross-chain access request, so that the node devices of the first blockchain may perform retrieval based on the unique identification code of the measurement device, after verifying that a measurement device user possesses corresponding access permission (e.g., as an implementation of management authority), and then send the device state information requested to be accessed to the measurement device user node device quickly across chains.

For example, a manufacturer of the measurement device, a logistics agency, and the measurement authentication institute, as reliable partners to each other, may build a blockchain (which may serve as a first blockchain) to store and share state information about the measurement device. After the development is completed, the measurement device needs to pass the authentication of relevant metering rules and regulations before coming into the market. Based on the method for managing information about a measurement device described herein, the manufacturer (e.g., as a data sender) first configures a model machine for the measurement device to be authenticated and sends the relevant configuration information to the first blockchain for storage, then the model machine which needs to be authenticated is transferred to a third party authentication institute through logistics, and logistics information produced in this process may also be uploaded to the first blockchain for storage by the logistics agency (e.g., as the data sender). The measurement authentication institute performs authentication with the metering rules and regulations after receiving the model machine of the measurement device, and authentication result information for the measurement device may be uploaded to the first blockchain. A manufacturer node device in the first blockchain may inquire for the authentication information about the measurement device in real time and the manufacturer node may make relevant improvements and/or updates to the measurement device in real-time. If an enterprise purchases the measurement device, since the enterprise terminal may not join the first blockchain, but belongs to a second blockchain, the enterprise terminal node device may access, based on the methods for managing information about a measurement device described herein, the authentication result information stored in the first blockchain across chains, so as to identify the reliability and security of the measurement device.

As another example, measurement device replicating parameters sent by the measurement device manufacturer node device may be stored in the first blockchain, so that node devices of the second blockchain obtain the measurement device replicating parameters after a cross-chain device replicating request described herein, thereby completing replicating of the measurement device.

Figure 2:
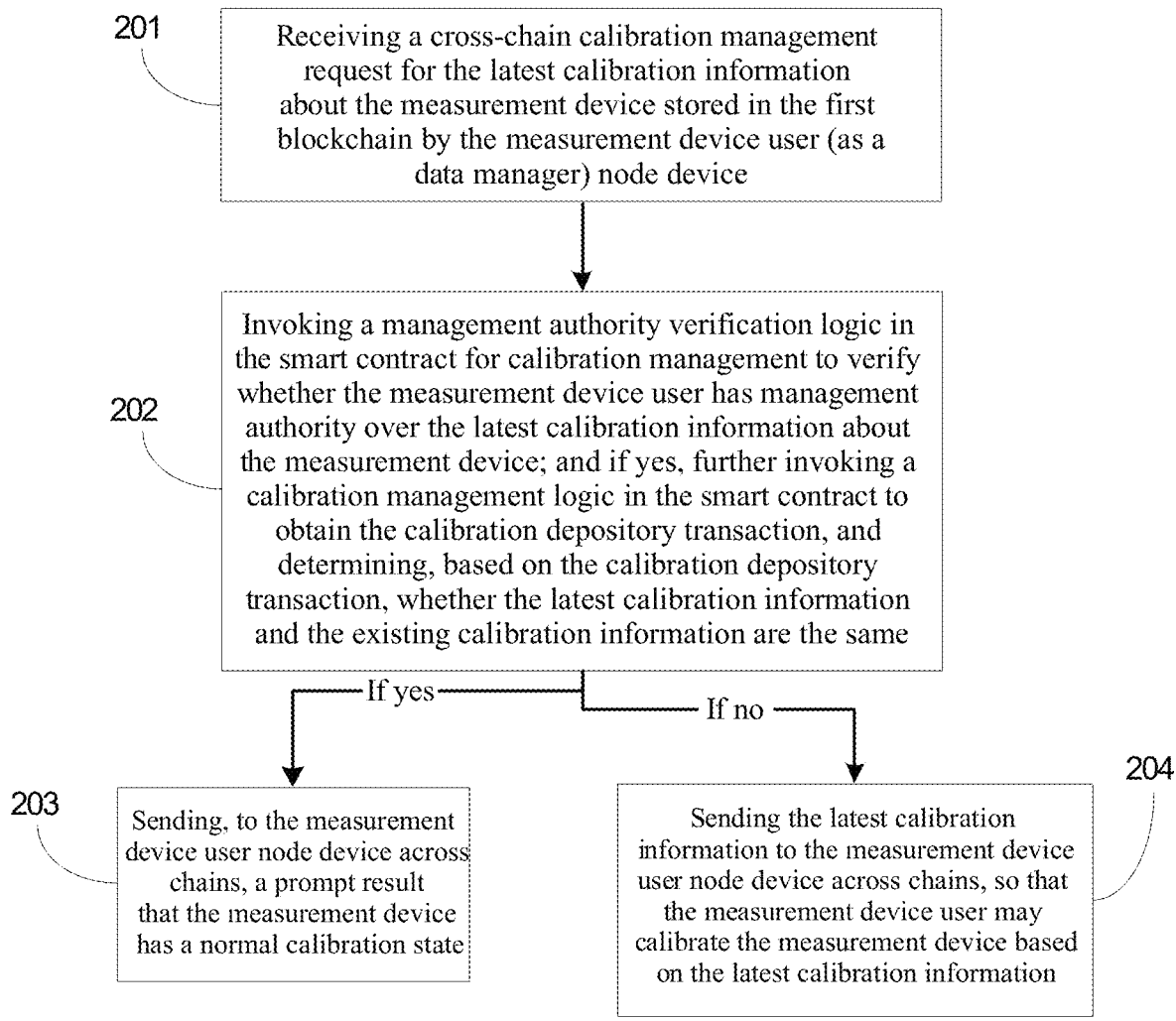
FIG. 2 is a schematic flow diagram of a method for managing calibration information about a measurement device according to yet another exemplary embodiment.

Calibration Information Management of Measurement Device Based on Smart Contract A user of a measurement device needs to calibrate the measurement device periodically, or on request, based on device management demands throughout the lifetime use of the measurement device. A calibration depository transaction sent by the measurement device manufacturer or a maintainer is stored in the first blockchain. The calibration depository transaction comprises the latest calibration information about the measurement device. FIG. 2 illustrates a process of managing calibration information about a measurement device based on the methods for managing a measurement device described herein. The process is performed by the node devices included in the first blockchain and comprises: step 201, receiving a cross-chain calibration management request for the latest calibration information about the measurement device stored in the first blockchain by the measurement device user (as a data manager) node device, wherein the cross-chain calibration management request comprises the existing calibration information about the measurement device and an address of a smart contract for calibration management deployed in the first blockchain; step 202, invoking a management authority verification logic in the smart contract for calibration management to verify whether the measurement device user has management authority over the latest calibration information about the measurement device; and if yes, further invoking a calibration management logic in the smart contract to obtain the calibration depository transaction, and determining, based on the calibration depository transaction, whether the latest calibration information and the existing calibration information are the same; step 203, if the latest calibration information and the existing calibration information are the same, sending, to the measurement device user node device across chains, a prompt result that the measurement device has a normal calibration state; and step 204, if the latest calibration information is different from the existing calibration information, sending the latest calibration information to the measurement device user node device across chains, so that the measurement device user may calibrate the measurement device based on the latest calibration information.

Calibration management of the measurement device may be completed automatically by initiating, by a data manager node device or based on a client installed on a smart device terminal such as a mobile phone, a cross-chain invocation of the smart contract deployed on the first blockchain, which saves the time and economic cost spent in calibrating the measurement device on site by professional personnel. Moreover, results of running the smart contract may be stored in the first blockchain in the form of a transaction log, and the node devices of the first blockchain, for example, the measurement device manufacturer or maintainer, may also access or determine the calibration state of the measurement device accurately by monitoring the results of running the smart contract, so as to facilitate providing measurement device maintenance or repair advice to the measurement device user.

Method for Managing Electronic Lead-Sealing Information about Measurement Device Based on Smart Contract In order to ensure the security or accuracy of the measurement device and prevent the measurement device from being enabled (e.g., turned on/off, etc.) or having parameters changed without authorization, an electronic lead-sealing module is generally provided for protecting the measurement device. The electronic lead-sealing module (such as an RFID radio frequency chip) is configured with a unique lead-sealing identification code which may correspond to an identity identifier such as a product serial number of the measurement device (e.g., on a one-to-one basis). In this embodiment, a lead-sealing identification code depository transaction sent by the measurement device manufacturer or maintainer may be stored in the first blockchain, and the transaction comprises the latest lead-sealing identification code of the measurement device.

Figure 3:
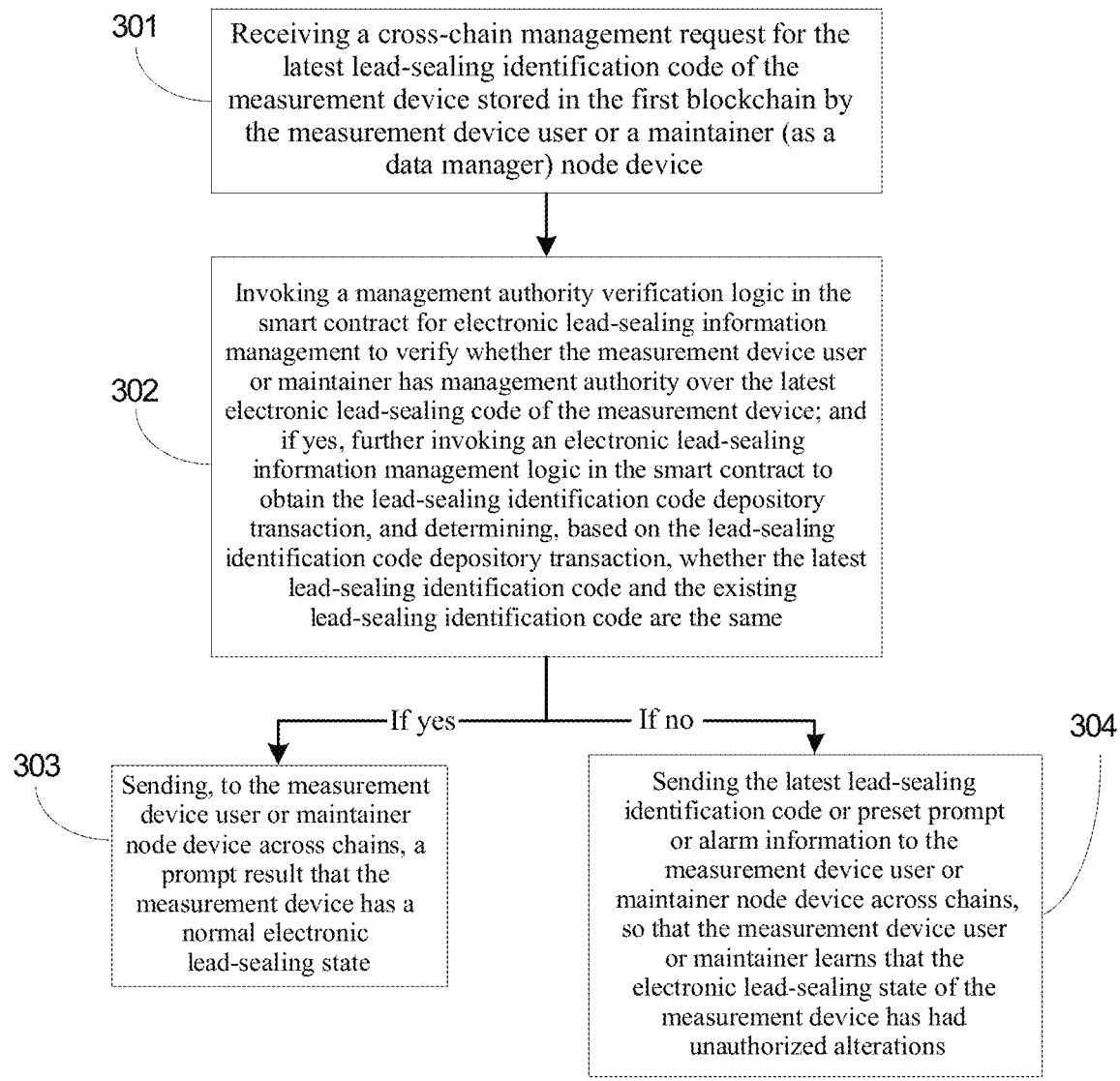
FIG. 3 is a schematic flow diagram of a method for managing an electronic lead-sealing state of a measurement device according to yet another exemplary embodiment.

FIG. 3 illustrates a process of managing electronic lead-sealing information about a measurement device based on the method for managing a measurement device provided in the specification. The process is performed by the node devices included in the first blockchain and comprises: step 301, receiving a cross-chain management request for the latest lead-sealing identification code of the measurement device stored in the first blockchain by the measurement device user or a maintainer (as a data manager) node device, wherein the cross-chain management request comprises the existing lead-sealing identification code of the measurement device and an address of a smart contract for electronic lead-sealing information management deployed in the first blockchain; step 302, invoking a management authority verification logic in the smart contract for electronic lead-sealing information management to verify whether the measurement device user or maintainer has management authority over the latest electronic lead-sealing code of the measurement device; and if yes, further invoking an electronic lead-sealing information management logic in the smart contract to obtain the lead-sealing identification code depository transaction, and determining, based on the lead-sealing identification code depository transaction, whether the latest lead-sealing identification code and the existing lead-sealing identification code are the same; step 303, if the latest lead-sealing identification code and the existing lead-sealing identification code are the same, sending, to the measurement device user or maintainer node device across chains, a prompt result that the measurement device has a normal electronic lead-sealing state; and step 304, if the latest lead-sealing identification code is different from the existing lead-sealing identification code, sending the latest lead-sealing identification code or preset prompt or alarm information to the measurement device user or maintainer node device across chains, so that the measurement device user or maintainer learns that the electronic lead-sealing state of the measurement device has had unauthorized alterations.

Electronic lead-sealing information management of the measurement device may be completed executed automatically by initiating, by a data manager node device or based on a client installed on a smart device terminal such as a mobile phone, a cross-chain invocation of the smart contract deployed on the first blockchain, which saves the time and economic cost spent in comparing the electronic lead-sealing codes of the measurement device on site by professional personnel. Moreover, results of running the smart contract may be stored in the first blockchain in the form of a transaction log, and the node devices of the first blockchain, for example, the measurement device manufacturer or maintainer, may also learn the existing electronic lead-sealing code state of the measurement device accurately by monitoring the results of running the smart contract, so as to facilitate providing measurement device maintenance or repair advice to the measurement device user.

Method for Managing Abnormal State of Measurement Device

Manufacturers of the measurement device may build a manufacturer blockchain based on their own information security management demands. As described in the embodiments described herein, the manufacturer blockchain may also include node devices such as logistics agencies, measurement device authentication institutes, or maintainers of the measurement device. Users of the measurement device may build a user blockchain (such as a private chain) based on their own information security management demands, or join a multi-user blockchain formed by multiple measurement device users. The measurement device itself may also be used as a node device of the user blockchain. The node device directly sends data information acquired by the measurement device to the user blockchain during use.

The measurement device is generally configured with various types of sensors to acquire data signals or monitor a use environment condition for the device. During use, when abnormal state information, for example, abnormal temperature information, humidity information, shock information, and the like, is sensed by the measurement device or a sensing module provided in the measurement device, the abnormal state information may be uploaded, in a transaction format, to the user blockchain to which the measurement device belongs, so as to perform blockchain depository for the above abnormal state information.

The manufacturer or maintainer of the measurement device, when performing failure analysis on the measurement device, can initiate a cross-chain data access request to the user blockchain based on the method for managing information about the measurement device described herein, so as to receive the abnormal state information sent by the node devices of the user blockchain across chains, after the request permission is verified. In the process, for example, the user blockchain is referred to as the first blockchain described in the above embodiments, and the manufacturer blockchain is referred to as the second blockchain described in the above embodiments.

After obtaining the abnormal state information, the manufacturer or maintainer of the measurement device may perform preliminary high-probability failure analysis by performing big data analysis on the abnormal state information or combining relevant technologies such as artificial intelligence technology, and at the same time, uploading the failure analysis results to the manufacturer blockchain.

After this, the measurement device user node device may initiate a cross-chain data access request to the manufacturer blockchain based on the method for managing information about the measurement device described in one or more of the above embodiments, so as to receive the failure analysis result information sent by the node devices of the manufacturer blockchain across chains, after the request permission is verified. In the above process, the manufacturer blockchain is then the first blockchain described in the above embodiments, and the user blockchain is the second blockchain described in the above embodiments.

Through the above information management process, the user of a measurement device may access the analysis result of the abnormal failure of the measurement device without the presence of professional maintenance personnel (which may include strategies that the user can implement to address any risk(s) of failure), thus greatly saving the cost of failure analysis or maintenance of the measurement device performed by professional failure maintenance or analysis personnel on site.

Method for Managing Software Version Upgrading of Measurement Device Based on Smart Contract In yet another illustrated embodiment, the target depository transaction stored in the first blockchain (such as the manufacturer blockchain) may include the latest software program corresponding to the measurement device and the version number of the latest software program, and a smart contract for software management of the measurement device is deployed in the first blockchain.

The measurement device nodes in the second blockchain (such as the user blockchain) may periodically send a version management request to the first blockchain across chains. The version management request includes the version number of the current software program of the measurement device. After verifying that the measurement device has a preconfigured software or software version, the smart contract is used to obtain the target depository transaction, and compare the version number of the latest software program contained in the target depository transaction and the version number of the current software program. When the two version numbers are different by a preconfigured level, the latest software program may be sent to the measurement device nodes in the second blockchain across chains to enable the measurement device nodes to perform software version upgrading.

Method for Managing Measurement Result Verification of Measurement Device Based on Smart Contract The method for managing information about a measurement device described herein may also be used to store and verify measurement results. In yet another illustrated embodiment, the target depository transaction stored in the first blockchain (such as the user blockchain) may include first measurement result information obtained by measuring an object to be measured by means of a node device (as a data sender) of the first blockchain using a measurement device, and a smart contract for measurement result verification of the measurement device is deployed in the first blockchain.

Figure 4:
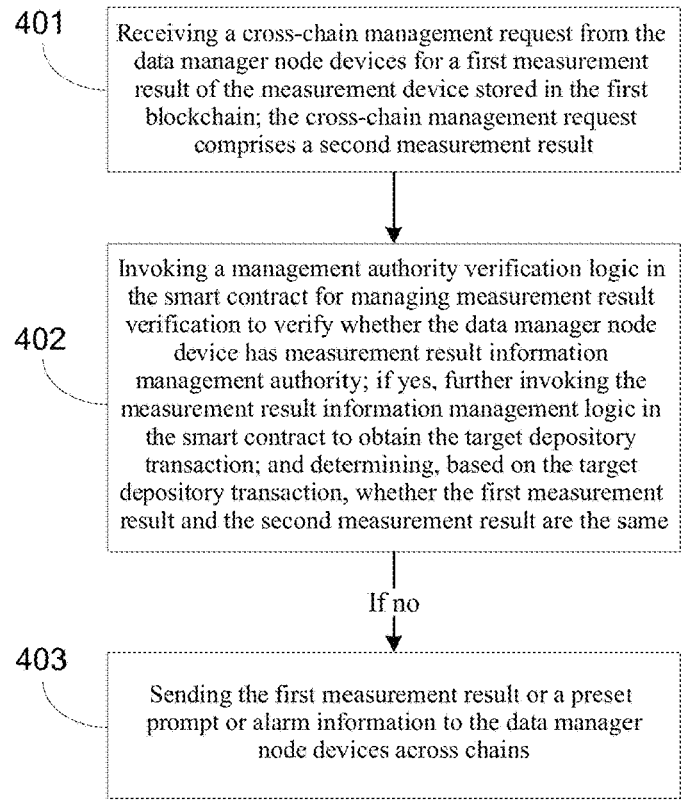
FIG. 4 is a schematic flow diagram of a method for managing measurement result verification of a measurement device according to yet another exemplary embodiment.

As shown in FIG. 4, the node devices in the second blockchain (such as another user blockchain) may use the same or same type of measurement device to measure the same or same type of object to be measured to obtain second measurement result information; and initiate, based on the second measurement result information, a cross-chain measurement result management request to the node devices of the first blockchain to invoke the smart contract. After verifying that the node device of the second blockchain has a preset measurement result information management authority, the smart contract is used to obtain the target depository transaction, and compare whether the first measurement result information contained in the target depository transaction and the second measurement result information are the same; and if the first measurement result information is different from the second measurement result information, the first measurement result information or a preset prompt or alarm operation may be sent to the node device (as a data manager) of the second blockchain across chains to prompt the node device of the second blockchain that the measurement result on the object to be measured that is obtained by means of a measurement device used by that node device itself is different from the measurement results on the same or same type of object to be measured that are obtained by other parties by means of the same or same type of measurement device, so as to find the cause.

Method for Managing Operation Information about Measurement Device Based on Smart Contract The method for managing information about a measurement device as described herein may also be used to store and verify operation information about the measurement device. In yet another illustrated embodiment, the target depository transaction stored in the first blockchain (such as the user blockchain or the manufacturer blockchain) may include first device operation information obtained by means of a node device (as a data sender) of the first blockchain using a measurement device. The device operation information may include an input parameter range, temperature and humidity conditions, and the like for operating the device, and a smart contract for managing the operation information about the measurement device is deployed in the first blockchain.

Figure 5:
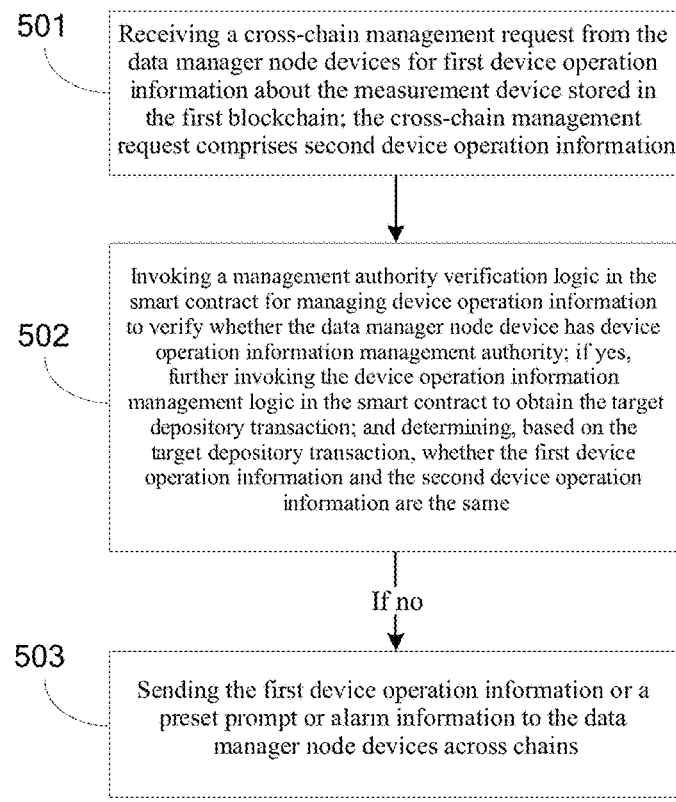
FIG. 5 is a schematic flow diagram of a method for managing device operation information about a measurement device according to yet another exemplary embodiment.

As shown in FIG. 5, the node devices in the second blockchain (such as another user blockchain) may initiate, based on second device operation information when using the same or same type of measurement device, a cross-chain measurement device operation information management request to the node devices of the first blockchain to invoke the smart contract. After verifying that the node device of the second blockchain has a preset measurement device operation information management authority, the smart contract is used to obtain the target depository transaction, and determine whether the first device operation information contained in the target depository transaction and the second device operation information are the same; and if the first device operation information is different from the second device operation information, the first device operation information or a preset prompt or alarm operation may be sent to the node device (as a data manager) of the second blockchain across chains to prompt the node device of the second blockchain that the device operation information that is obtained by that node device itself by means of a measurement device is different from device operation information that is obtained by other parties by means of the same or same type of measurement device, so as to find the cause.

In particular, the first device operation information may be a standard for operation information about a measurement device, which is sent by a device manufacturer node device or a maintainer node device of the first blockchain to the first blockchain for depository; and any device user of the second blockchain may learn, based on the cross-chain invocation of the smart contract, whether its operation on the measurement device conforms to a preset operation standard so as to improve the measurement precision.

Method for Managing Electronic Contract Signing of Measurement Device

When a user of a measurement device purchases a measurement device (e.g., from a manufacturer), the user usually needs to sign a purchase contract. In yet another illustrated embodiment, the manufacturer node device of the measurement device belongs to the manufacturer blockchain described in one of the above embodiments, and the user node device of the measurement device belongs to the user blockchain.

The manufacturer node device of the measurement device may send the electronic contract signed by itself to the manufacturer blockchain to which it belongs; the user node device of the measurement device initiates a cross-chain access request to the electronic contract and obtains, after it is verified that a node device of the manufacturer blockchain has an access permission for the electronic contract, the electronic contract and sends the electronic contract signed by the user to the user blockchain to which it belongs. At this time, the manufacturer node device may also initiate a cross-chain access request to the electronic contract to the user's blockchain and obtain, after it is verified that a node device of the user blockchain has an access permission for the electronic contract, the electronic contract signed by both parties.

It is known to a person skilled in the art that the user of the measurement device may also sign the electronic contract first, and then obtain the electronic contract signed by both parties after the two similar cross-chain access processes described above.

The manufacturer blockchain and the user blockchain may be used as the first blockchain or the second blockchain to complete the signing process of the electronic contract; and based on the tamper-resistant mechanism for blockchains, the process of contract signing is deposited at nodes.

Corresponding to the above process implementation, the embodiments described herein further provide an apparatus 60 for managing information about a measurement device. The apparatus 60 may be implemented by software, and may also be implemented by hardware or a combination of software and hardware. Taking software implementation as an example, as an apparatus in a logical sense, it is formed by reading a corresponding computer program instruction into a memory through a CPU (Central Process Unit) of a device where it is located. In terms of hardware, for example, in addition to the CPU, the internal storage, and the memory shown in FIG. 7, (e.g., the device where the above apparatus is located) the apparatus 60 generally also includes other hardware, such as a chip for wireless signal transmission and reception, and/or a hardware configured to provide network communication functions and other hardware that might be useful to blockchain and/or sensor or device management.

Figure 6:
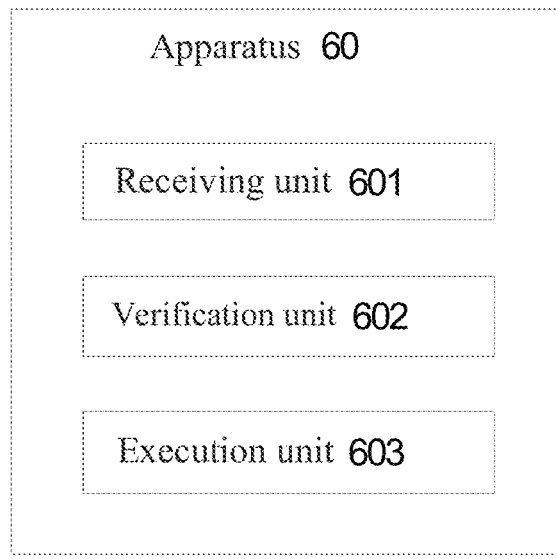
FIG. 6 is a schematic diagram of an apparatus for managing information about a measurement device according to an exemplary embodiment.

As shown in FIG. 6, the apparatus 60 can also be used for managing information about a measurement device, which is applied to a network system including a plurality of blockchains, the network system comprising data sender node devices and data manager node devices, wherein the data sender node devices are node devices for a first blockchain, and the data manager node devices are node devices for a second blockchain; the first blockchain storing a target depository transaction, sent by the data sender node devices, that comprises device state information about the measurement device; the apparatus 60 being applied at a node device of the first blockchain, and comprising: a receiving unit 602 for receiving a cross-chain management request from the data manager node devices for the device state information about the measurement device stored in the first blockchain; a verification unit 604 for verifying, in response to the cross-chain management request, whether the data manager has a management authority over the device state information about the measurement device; and an execution unit 606 for obtaining the target depository transaction, and performing management of the device state information about the measurement device based on the target depository transaction.

In yet another illustrated embodiment, the cross-chain management request is a request for obtaining the device state information about the measurement device across chains; and the execution unit 606 is further configured to: obtain the target depository transaction, and send the device state information about the measurement device to the data manager node devices across chains.

In yet another illustrated embodiment, the first blockchain is deployed with a smart contract for managing the device state information, and a processing logic corresponding to the contract code of the smart contract comprises a management authority verification logic; and the verification unit 602 is further configured to: invoke, in response to the cross-chain access request, the management authority verification logic in the smart contract to verify whether the data manager has the management authority over the device state information about the measurement device.

In yet another illustrated embodiment, the processing logic corresponding to the contract code of the smart contract further comprises a management logic for the device state information; and the execution unit 606 is further configured to: further invoke, after verifying that the data manager has the management authority over the device state information about the measurement device, the management logic in the smart contract for the device state information, obtain the target depository transaction, and perform management of the device state information about the measurement device based on the target depository transaction.

In yet another illustrated embodiment, the first blockchain and the second blockchain are different sub-chains belonging to the same alliance chain.

In yet another illustrated embodiment, the receiving unit 602 is further configured to: receive, via a cross-chain relay device, a cross-chain access request from the data manager node devices for the device state information about the measurement device stored in the first blockchain.

In yet another illustrated embodiment, the data sender node devices comprise one or more of a production recording node device of the measurement device, or an initial calibration node device, or a measurement authentication institute node device, or a logistics agency node device; the target depository transaction comprises a unique identification code corresponding to the measurement device; and the device state information comprises one or more of raw material information, production process information, initial calibration information, quality certification information, logistics circulation information, or a device replicating parameter.

In yet another illustrated embodiment, the target depository transaction comprises the latest electronic lead-sealing code of the measurement device; the cross-chain management request comprises an existing lead-sealing identification code of the measurement device; and the management logic for the device state information that is comprised by the processing logic corresponding to the contract code of the smart contract comprises: step A, obtaining the target depository transaction; step B, determining, based on the target depository transaction, whether the latest lead-sealing identification code and the existing lead-sealing identification code are the same; and step C, sending, if the latest lead-sealing identification code is different from the existing lead-sealing identification code, a preset prompt or alarm operation to the data manager node devices across chains.

In yet another illustrated embodiment, the target depository transaction comprises the latest calibration information about the measurement device; the cross-chain management request comprises existing calibration information about the measurement device; and the management logic for the device state information that is comprised by the processing logic corresponding to the contract code of the smart contract comprises: step A, obtaining the target depository transaction; step B, determining, based on the target depository transaction, whether the latest calibration information and the existing calibration information are the same; and step C, sending, if the latest calibration information is different from the existing calibration information, the latest calibration information to the data manager node devices across chains, so that the data manager node devices can calibrate the measurement device based on the latest calibration information.

In yet another illustrated embodiment, the target depository transaction comprises the latest software program corresponding to the measurement device and the version number of the latest software program; the data manager node device is the measurement device; the cross-chain management request comprises the version number of a current software program of the measurement device; and the management logic for the device state information that is comprised by the processing logic corresponding to the contract code of the smart contract comprises: step A, obtaining the target depository transaction; step B, comparing, based on the target depository transaction, whether the version number of the latest software program and the version number of the current software program differ by a preset level; and step C, if yes, sending the latest software program to the measurement device across chains, so that the measurement device performs upgrading of the software version.

For details about the implementation process of the functions and effects of the units in apparatus 60, see the implementation process of the corresponding elements or features described with respect to the methods for managing information about a measurement device performed by the node devices of the first blockchain, and for the relevant parts, see the descriptions provided above.

The embodiments of the apparatus described herein are merely illustrative, and units illustrated as separate components may be or may not be physically separated, and the components illustrated as units may or may not be physical modules, that is, may be positioned at one place or may be distributed to multiple network modules. Some or all of the units or modules may be selected according to actual needs to achieve the objectives of the solution in this specification. Those of ordinary skill in the art can understand and implement the invention without creative efforts.

The apparatus, units, and modules described in the above embodiments may be specifically implemented by a computer chip or entity, or may be implemented by a product having a certain function. A typical implementation device is a computer, and the specific form of the computer may be a personal computer, a laptop computer, a cellular phone, a camera phone, a smart phone, a personal digital assistant, a media player, a navigation device, an email sending and receiving device, and a game control desk, a tablet computer, a wearable device, or a combination of any of these devices.

Figure 7:
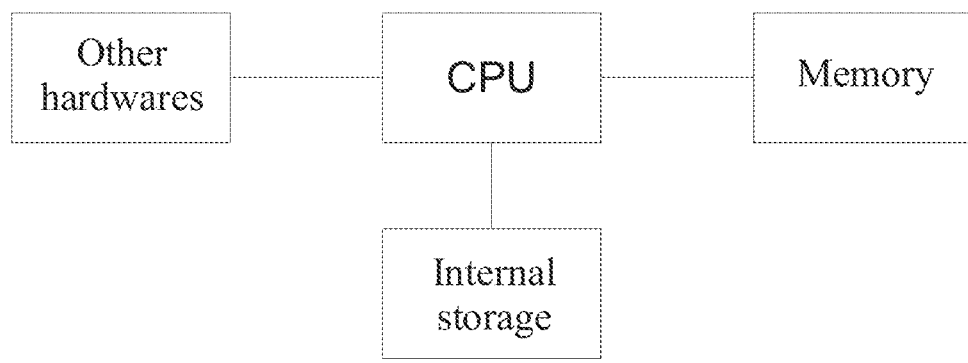
FIG. 7 is a structural diagram of hardware for implementing embodiments of the apparatus for managing information about a measurement device provided in the specification.

Corresponding to the above embodiments of the method, the embodiments of the specification further provides a computer device, as shown in FIG. 7, which includes a memory and a processor. The memory has stored thereon a computer program executable by the processor. The processor, when executing the stored computer program, implementing the various steps of the method for managing information about a measurement device, which is performed by the node devices of the first blockchain as described in the embodiments of the specification. For a detailed description of each step of the method for managing information about a measurement device which is performed by the node devices of the first blockchain, please refer to the previous content, and will not be repeated.

Corresponding to the above embodiments of the method, the embodiments of the specification further provide a computer readable storage medium which has stored thereon a computer program that, when executed by a processor, cause the implementation of the steps of the method for managing information about a measurement device, which is performed by the node devices of the blockchain as described herein. For a detailed description of each step of the method for managing information about a measurement device which is performed by the node devices of the first blockchain, please refer to descriptions provided herein.

The examples provided herein are only examples and are not intended to be limiting. Any modification, equivalent replacement, or improvement made within the spirit and principles of this specification shall be included within the protection scope of this specification.

In a typical configuration, a computing device comprises one or more central processing units (CPUs), an input/output interface, a network interface, and a memory.

The memory may include a non-permanent memory, a random access memory (RAM) and/or a non-volatile memory (such as a read-only memory (ROM) or a flash memory (flash RAM)) and so on in a computer-readable medium. The memory is an example of the computer-readable mediums.

The computer-readable medium comprises non-volatile and volatile media, and removable and non-removable media, wherein information storage can be implemented with any method or technology. Information may be computer-readable instructions, data structures, modules of programs, or other data.

The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

It should further be noted that the terms "comprising", "including" or any other variations thereof are intended to cover non-exhaustive inclusion, so that processes, methods, merchants or devices including a series of elements not only include those elements but also include other elements which are not listed expressly or include all inherent elements of such processes, methods, commodities or devices. If no more limitations are made, an element limited by "comprising a/an . . . " does not exclude other identical elements existing in the process, the method, the commodity, or the device which includes the element.

A person skilled in the art will understand that an embodiment of the disclosure may be provided as a method, a system, or a computer program product. Therefore, the embodiments of the specification may use a form of hardware only embodiments, software only embodiments, or embodiments with a combination of software and hardware. Moreover, the embodiments of the specification may use a form of a computer program product that is implemented on one or more computer-usable storage media (including but not limited to a disk memory, a CD-ROM, an optical memory, and the like) that comprise computer usable program code.

What is claimed is:

1. A computer-implemented method, comprising:
   accessing and executing, by a first node device connected to a first blockchain, a first smart contract deployed on the first blockchain, wherein the first smart contract comprises a first management logic comprising instructions for managing a first device state information, wherein the first device state information comprises manufacturing information and quality control metrics for a first measurement device;
   receiving, by the first node device from a second node device, a cross-chain management request comprising a request to perform application management based on programming of the first smart contract, wherein the cross-chain management request includes a unique identification code corresponding to the first measurement device; and
   in response to receiving the cross-chain management request by the first node device:
      performing, by the first node device, a first determination that the second node device is authorized to access or obtain the first device state information from the first blockchain, wherein the first determination is based on the first management logic;
      based on the first determination, accessing or obtaining, by the second node device, the first device state information;
      storing, by the second node device on a second blockchain, a second device state information that is generated based on the first device state information and additional information, wherein the second blockchain is different from the first blockchain; and
      based on the accessed or obtained first device state information, executing, by the second node device, a second smart contract deployed on the second blockchain to perform application management of the first measurement device based on the second device state information.

2. The computer-implemented method of claim 1, wherein application management comprises:
   performing at least one application management task that includes at least one of: electronic lead-sealing of the first measurement device, new software program updating of the first measurement device, creating new entries on the second blockchain based on discrepancies between the first device state information and the second device state information, sending preset alarm instructions, sending a first measurement device result information, wherein the result information comprises a transaction log of system failures, or sending a first measurement device operation information, wherein a first measurement device operation information comprises input parameter ranges, temperature conditions, and humidity conditions for the first measurement device.

3. The computer-implemented method of claim 2, wherein electronic lead-sealing of the first measurement device comprises, by the second node device:
   obtaining a first lead-sealing identification code of the first measurement device stored on the first blockchain and a second lead-sealing identification code of the first measurement device stored on the second blockchain; and
   in response to a determination that the first lead-sealing identification code and the second lead-sealing identification code are different, writing the first lead-sealing identification code to the second blockchain.

4. The computer-implemented method of claim 2, wherein sending preset alarm instructions comprises, by the second node device:
   obtaining a first result information for the first measurement device stored on the first blockchain and a second result information for the first measurement device stored on the second blockchain; and
   in response to a determination that the first result information and the second result information are different, writing, to the second blockchain, alarm information indicating that there is a discrepancy between the first result information and the second result information.

5. The computer-implemented method of claim 1, further comprising:
   accessing, by the first node device from the first blockchain, a first depository transaction comprising first device state information for the first measurement device; and writing, by the first node device to the first blockchain, the first device state information.

6. The computer-implemented method of claim 1, wherein the first device state information and the second device state information comprise one or more of: raw material information, production process information, initial calibration information, quality certification information, logistics circulation information, a device replicating parameter, abnormal state information, measurement data record information, maintenance record information, or electronic contract information related to the first measurement device.

7. The computer-implemented method of claim 1, wherein a relay node device is interfaced between the first blockchain and the second blockchain and transmits data between the first blockchain and the second blockchain.

8. The computer-implemented method of claim 7, wherein the cross-chain management request is sent from the second node device to the first node device via the relay node device.

9. A system, comprising:
   a computer readable storage medium having program instructions embodied therewith; and
   one or more processors configured to execute the program instructions to cause the system to:
   access and execute, by a first node device connected to a first blockchain, a first smart contract deployed on the first blockchain, wherein the first smart contract comprises a first management logic comprising instructions for managing a first device state information, wherein the first device state information comprises manufacturing information and quality control metrics for a first measurement device;
   receive, by the first node device from a second node device, a cross-chain management request comprising a request to perform application management based on programming of the first smart contract, wherein the cross-chain management request includes a unique identification code corresponding to the first measurement device; and
   in response to receiving the cross-chain management request by the first node device:
      perform, by the first node device, a first determination that the second node device is authorized to access or obtain the first device state information from the first blockchain, wherein the first determination is based on the first management logic;
      based on the first determination, access or obtain, by the second node device, the first device state information; store, by the second node device on a second blockchain, a second device state information that is generated based on the first device state information and additional information, wherein the second blockchain is different from the first blockchain; and
      based on the accessed or obtained first device state information, execute, by the second node device, a second smart contract deployed on the second blockchain to perform application management of the first measurement device based on the second device state information.

10. The system of claim 9, wherein application management comprises:
    performing at least one application management task that includes at least one of: electronic lead-sealing of the first measurement device, new software program updating of the first measurement device, creating new entries on the second blockchain based on discrepancies between the first device state information and the second device state information, sending preset alarm instructions, sending a first measurement device result information, wherein the result information comprises a transaction log of system failures, or sending a first measurement device operation information, wherein a first measurement device operation information comprises input parameter ranges, temperature conditions, and humidity conditions for the first measurement device.

11. The system of claim 10, wherein electronic lead-sealing of the first measurement device comprises, by the second node device:
    obtaining a first lead-sealing identification code of the first measurement device stored on the first blockchain and a second lead-sealing identification code of the first measurement device stored on the second blockchain; and
    in response to a determination that the first lead-sealing identification code and the second lead-sealing identification code are different, writing the first lead-sealing identification code to the second blockchain.

12. The system of claim 10, wherein sending preset alarm instructions comprises, by the second node device:
    obtaining a first result information for the first measurement device stored on the first blockchain and a second result information for the first measurement device stored on the second blockchain; and
    in response to a determination that the first result information and the second result information are different, writing, to the second blockchain, alarm information indicating that there is a discrepancy between the first result information and the second result information.

13. The system of claim 9, wherein the first device state information and the second device state information comprise one or more of: raw material information, production process information, initial calibration information, quality certification information, logistics circulation information, a device replicating parameter, abnormal state information, measurement data record information, maintenance record information, or electronic contract information related to the first measurement device.

14. The system of claim 9, wherein a relay node device is interfaced between the first blockchain and the second blockchain and transmits data between the first blockchain and the second blockchain.

15. The system of claim 14, wherein the cross-chain management request is sent from the second node device to the first node device via the relay node device.

16. A computer program product comprising a non-transitory computer-readable storage medium having program instructions embodied therewith, the program instructions executable by one or more processors to cause the one or more processors to:
    access and execute, by a first node device connected to a first blockchain, a first smart contract deployed on the first blockchain, wherein the smart contract comprises a first management logic comprising instructions for managing a first device state information, wherein the first device state information comprises manufacturing information and quality control metrics for a first measurement device;
    receive, by the first node device from a second node device, a cross-chain management request comprising a request to perform application management based on programming of the first smart contract, wherein the cross-chain management request includes a unique identification code corresponding to the first measurement device; and in response to receiving the cross-chain management request by the first node device:
perform, by the first node device, a first determination that the second node device is authorized to access or obtain the first device state information from the first blockchain, wherein the first determination is based on the first management logic;
based on the first determination, access or obtain, by the second node device, the first device state information; store, by the second node device on a second blockchain, a second device state information that is generated based on the first device state information and additional information, wherein the second blockchain is different from the first blockchain; and
based on the accessed or obtained first device state information, execute, by the second node device, a second smart contract deployed on the second blockchain to perform application management of the first measurement device based on the second device state information.

17. The computer program product of claim 16, wherein application management comprises:
performing at least one application management task that includes at least one of: electronic lead-sealing of the first measurement device, new software program updating of the first measurement device, creating new entries on the second blockchain based on discrepancies between the first device state information and the second device state information, sending preset alarm instructions, sending a first measurement device result information, wherein the result information comprises a transaction log of system failures, or sending a first measurement device operation information, wherein a first measurement device operation information comprises input parameter ranges, temperature conditions, and humidity conditions for the first measurement device.

18. The computer program product of claim 17, wherein electronic lead-sealing of the first measurement device comprises, by the second node device:
obtaining a first lead-sealing identification code of the first measurement device stored on the first blockchain and a second lead-sealing identification code of the first measurement device stored on the second blockchain; and
in response to a determination that the first lead-sealing identification code and the second lead-sealing identification code are different, writing the first lead-sealing identification code to the second blockchain.

19. The computer program product of claim 17, wherein sending preset alarm instructions comprises, by the second node device:
obtaining a first result information for the first measurement device stored on the first blockchain and a second result information for the first measurement device stored on the second blockchain; and
in response to a determination that the first result information and the second result information are different, writing, to the second blockchain, alarm information indicating that there is a discrepancy between the first result information and the second result information.

* * * * *

UNITED STATES PATENT AND TRADEMARK OFFICE
CERTIFICATE OF CORRECTION

| | | |
|---|---|---|
| PATENT NO. | : 12,197,599 B2 | Page 1 of 1 |
| APPLICATION NO. | : 17/147345 | |
| DATED | : January 14, 2025 | |
| INVENTOR(S) | : Qianni Duan | |

It is certified that error appears in the above-identified patent and that said Letters Patent is hereby corrected as shown below:

On the Title Page

Column 1, Lines 3-4, under Item (54) Title, delete "MEASUREMENT DEVICE PRELIMINARY CLASS" and insert --MEASUREMENT DEVICE--.

Column 1, Line 7, under Item (73) Assignees, delete "Co., Ltd. Ltd., Shanghai" and insert --Co., Ltd., Shanghai--.

In the Specification

In Column 1, Lines 3-4, under Title, delete "MEASUREMENT DEVICE PRELIMINARY CLASS" and insert --MEASUREMENT DEVICE--.

Signed and Sealed this
Eleventh Day of March, 2025

Coke Morgan Stewart
*Acting Director of the United States Patent and Trademark Office*